United States Patent
Watt, Jr. et al.

(10) Patent No.: US 11,157,304 B2
(45) Date of Patent: Oct. 26, 2021

(54) SYSTEM FOR PEERING CONTAINER CLUSTERS RUNNING ON DIFFERENT CONTAINER ORCHESTRATION SYSTEMS

(71) Applicant: Dell Products L. P., Round Rock, TX (US)

(72) Inventors: James S. Watt, Jr., Austin, TX (US); Frank DiRosa, IV, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 203 days.

(21) Appl. No.: 16/671,361

(22) Filed: Nov. 1, 2019

(65) Prior Publication Data
US 2021/0132974 A1 May 6, 2021

(51) Int. Cl.
*G06F 9/455* (2018.01)
*G06F 9/48* (2006.01)

(52) U.S. Cl.
CPC ........ *G06F 9/45558* (2013.01); *G06F 9/4856* (2013.01); *G06F 2009/4557* (2013.01); *G06F 2009/45595* (2013.01)

(58) Field of Classification Search
CPC ................................................. G06F 9/45558
USPC ............................................................ 718/1
See application file for complete search history.

(56) References Cited

U.S. PATENT DOCUMENTS

| | | | | |
|---|---|---|---|---|
| 10,191,778 B1 * | 1/2019 | Yang | ................... | G06Q 30/0283 |
| 10,469,574 B1 * | 11/2019 | Dai | ...................... | G06F 9/45558 |
| 10,936,717 B1 * | 3/2021 | Herman Saffar | ....... | G06F 21/56 |
| 2002/0173984 A1 * | 11/2002 | Robertson | ............... | H04L 67/34 709/220 |
| 2010/0312809 A1 * | 12/2010 | Calder | .................. | G06F 9/5072 713/179 |
| 2011/0060821 A1 * | 3/2011 | Loizeaux | .............. | G06F 9/5072 709/224 |
| 2014/0101300 A1 * | 4/2014 | Rosensweig | ........ | H04L 41/5096 709/223 |
| 2018/0013636 A1 * | 1/2018 | Seetharamaiah | ..... | H04L 41/147 |
| 2018/0205759 A1 * | 7/2018 | Hosie | ...................... | H04L 67/10 |
| 2018/0309630 A1 * | 10/2018 | Zhao | .................. | H04L 41/0893 |
| 2018/0349199 A1 * | 12/2018 | Vyas | .................. | G06F 11/3003 |
| 2019/0050272 A1 * | 2/2019 | Liu | ...................... | H04L 41/5025 |
| 2019/0102157 A1 * | 4/2019 | Caldato | ................. | G06F 9/5083 |
| 2019/0102280 A1 * | 4/2019 | Caldato | ................. | G06F 9/5072 |
| 2019/0332421 A1 * | 10/2019 | Kozlowski | ............ | G06F 9/4401 |

(Continued)

*Primary Examiner* — Mehran Kamran (74) *Attorney, Agent, or Firm* — Krishnendu Gupta; Deepika Bhayana; Dorothy Wu Chiang (57) ABSTRACT

A system of one or more computers is configured to peer container clusters running on different container orchestration systems. One general aspect includes moving an endpoint service container between an original cluster and a target cluster of a cluster mesh. In at least one embodiment, a remote service endpoint container is instantiated at the original cluster using service registry information accessed by a mesh operator. In at least one embodiment, the service registry information includes the hostname/path information for the endpoint service container operating at the target cluster. The remote service endpoint container is configured to allow the dependent container at the original cluster to consume services available at the endpoint service container at the target cluster as though the endpoint service container is local to the dependent container.

18 Claims, 8 Drawing Sheets

(56) References Cited

U.S. PATENT DOCUMENTS

| | | | |
|---|---|---|---|
| 2020/0104161 A1* | 4/2020 | Kapur | G06F 11/2025 |
| 2020/0112487 A1* | 4/2020 | Inamdar | H04L 41/082 |
| 2020/0314173 A1* | 10/2020 | Pahwa | H04L 67/1021 |
| 2020/0379812 A1* | 12/2020 | Ranjan | G06F 16/958 |
| 2021/0004267 A1* | 1/2021 | Cui | G06F 9/4881 |
| 2021/0034423 A1* | 2/2021 | Hallur | G06F 9/5016 |
| 2021/0042151 A1* | 2/2021 | Muller | G06F 9/5088 |
| 2021/0124603 A1* | 4/2021 | Rafey | G06N 20/00 |

* cited by examiner

SYSTEM FOR PEERING CONTAINER CLUSTERS RUNNING ON DIFFERENT CONTAINER ORCHESTRATION SYSTEMS

BACKGROUND OF THE INVENTION

Field of the Disclosure

The present disclosure relates to information handling systems. More specifically, embodiments of the disclosure relate to a system for peering container clusters running on different container orchestration systems.

Description of the Related Art

As the value and use of information continues to increase, individuals and businesses seek additional ways to process and store information. Options available to users include information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

A system of one or more computers can be configured to perform particular operations or actions by virtue of having software, firmware, hardware, or a combination of them installed on the system that in operation causes or cause the system to peer container clusters running on different container orchestration systems. One general aspect includes a computer-implemented method for moving an endpoint service container between clusters of a cluster mesh, the cluster mesh including an original cluster and a target cluster, the method including: operating respective container orchestration systems at the original cluster and the target cluster, where the original cluster includes at least one endpoint service container and a dependent container configured to consume a service available at the endpoint service container; moving the endpoint service container from the original cluster to the target cluster; updating service registry information relating to moving the endpoint service container from the original cluster to the target cluster, where the service registry information includes a list of services that are globally available in the cluster mesh, where the list of services includes at least one service available at the endpoint service container in the target cluster; accessing the service registry information at the original cluster using a mesh operator executed by the container orchestration system of the original cluster; establishing a remote service endpoint container at the original cluster using service registry information accessed by the mesh operator of the original cluster; accessing the service registry information at the target cluster using a mesh operator executed by the container orchestration system of the target cluster; configuring an ingress container at the target cluster using the service registry information accessed by the mesh operator of the target cluster; and using the remote service endpoint container to allow the dependent container at the original cluster to consume services available from the endpoint service container of the target cluster. Other embodiments of this aspect include corresponding computer systems, apparatus, and computer programs recorded on one or more computer storage devices, each configured to perform the actions of the methods.

Another general aspect includes a system including: a processor; a data bus coupled to the processor; and a non-transitory, computer-readable storage medium embodying computer program code, the non-transitory, computer-readable storage medium being coupled to the data bus, the computer program code interacting with a plurality of computer operations and including instructions executable by the processor and configured for: operating respective container orchestration systems at an original cluster and a target cluster, where the original cluster includes at least one endpoint service container and a dependent container configured to consume a service available at the endpoint service container; moving the endpoint service container from the original cluster to the target cluster; updating service registry information relating to moving the endpoint service container from the original cluster to the target cluster, where the service registry information includes a list of services that are globally available in a cluster mesh that includes the original cluster and target cluster, where the list of services includes at least one service available at the endpoint service container in the target cluster; accessing the service registry information at the original cluster using a mesh operator executed by the container orchestration system of the original cluster; establishing a remote service endpoint container at the original cluster using service registry information accessed by the mesh operator of the original cluster; accessing the service registry information at the target cluster using a mesh operator executed by the container orchestration system of the target cluster; configuring an ingress container at the target cluster using the service registry information accessed by the mesh operator of the target cluster; and using the remote service endpoint container to allow the dependent container at the original cluster to consume services available from the endpoint service container of the target cluster.

Another general aspect includes a non-transitory, computer-readable storage medium embodying computer program code, the computer program code including computer executable instructions configured for: operating respective container orchestration systems at an original cluster and a target cluster, where the original cluster includes at least one endpoint service container and a dependent container configured to consume a service available at the endpoint service container; moving the endpoint service container from the original cluster to the target cluster; updating service registry information relating to moving the endpoint service container from the original cluster to the target cluster, where the service registry information includes a list of services that are globally available in a cluster mesh that includes the original cluster and target cluster, where the list of services includes at least one service available at the endpoint service container in the target cluster; accessing the service registry information at the original cluster using a mesh operator executed by the container orchestration system of the original cluster; establishing a remote service endpoint container at the original cluster using service registry information accessed by the mesh operator of the original cluster; accessing the service registry information at the target cluster using a mesh operator executed by the container orchestration system of the target cluster; configuring an ingress container at the target cluster using the service registry information accessed by the mesh operator of the target cluster; and using the remote service endpoint container to allow the dependent container at the original cluster to consume services available from the endpoint service container of the target cluster.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

Microservice architectures are increasingly being used to deploy services in local and cloud-based information handling systems. A microservice is an independent, stand-alone capability designed as an executable or a process that communicates with other microservices through standard but lightweight interprocess communications such as Hypertext Transfer Protocol (HTTP), RESTful web services (built on the Representational State Transfer architecture), message queues, and the like. Microservices are unique when compared to standard monolithic applications in that each microservice is developed, tested, deployed, on-demand and independent of other microservices. Microservices are often deployed as container applications (such as, for example, Docker containers) that operate in a cluster under the management of a container orchestration system (such as, for example, Kubernetes, DockerSwarm, etc.).

A system, method, and computer-readable medium are disclosed for peering clusters in a cluster mesh when a container is moved from its original cluster to a target cluster. In certain embodiments, the cluster mesh includes a collection of container orchestration systems, which share a networking convention or implementation. In certain embodiments, code for a dependent container that is written to consume services at the original cluster need not be rewritten if the services are moved to the target cluster, even if the target cluster executes a different container orchestration system.

In certain embodiments, applications running in any cluster of the cluster mesh have direct access to any services of the mesh that have been flagged for global use. In certain embodiments, the dependent application containers are able to access the flagged services as if the flagged services are local (e.g., in the host name/path the dependent application container). In certain embodiments, the dependent application containers remain unaware of the running locations or external fully qualified domain names (FQDNs) of any of the flagged services on which the dependent application containers depend. In certain embodiments, dependent services do not need to be directly exposed to insecure clients in order to run in clusters that are remote or cloud-based. Rather, in certain embodiments, dependent services can be executed remotely in datacenters that are separated by strict firewall processes using secured connections, such as mutual TLS (mTLS) tunneling, which only require single port access between the clusters for peering. In certain embodiments, multicluster functionality is simplified and thinned by removing any need of sidecar injection.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
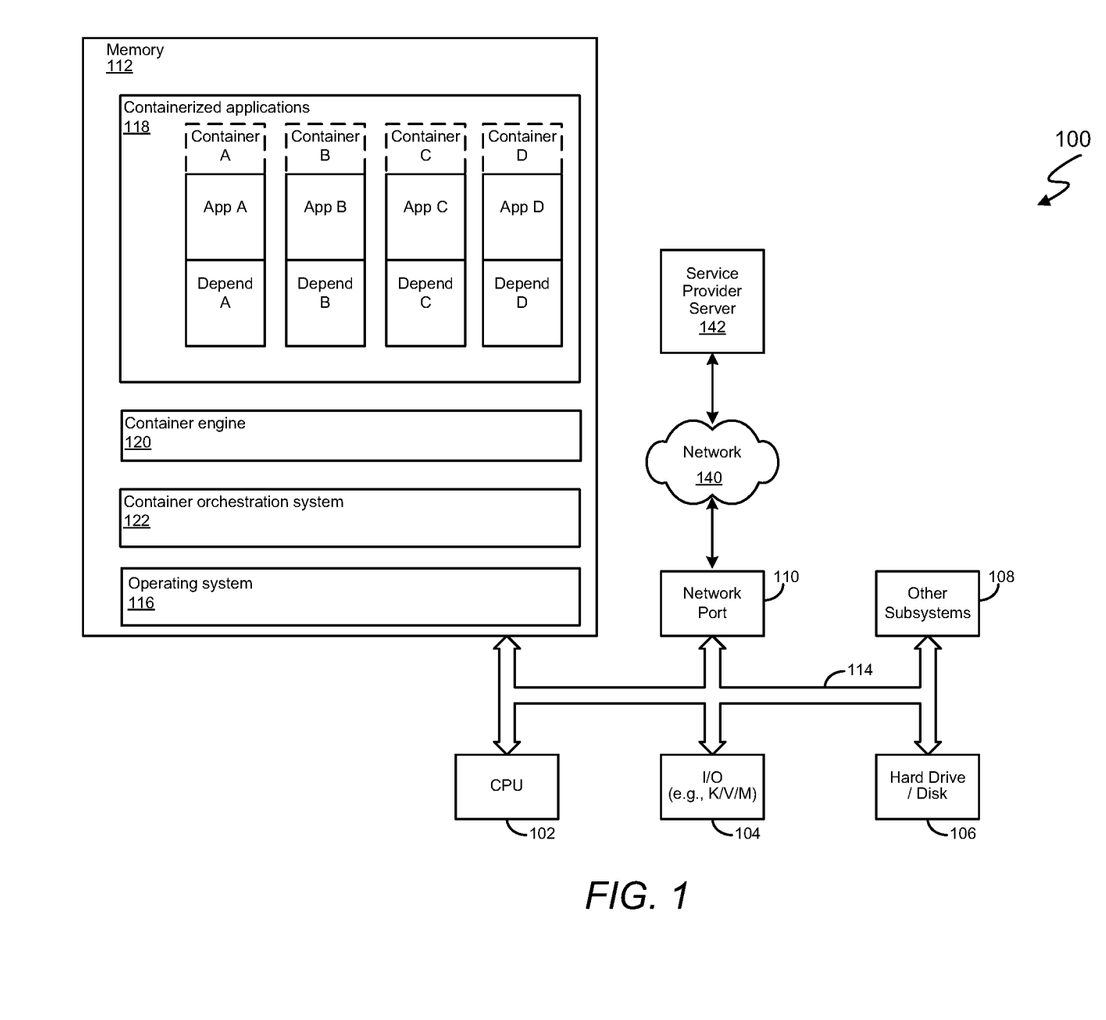
FIG. 1 is a generalized illustration of an information handling system that is configured to implement certain embodiments of the system and method of the present disclosure.

FIG. 1 is a generalized illustration of an information handling system 100 that is configured to implement certain embodiments of the system and method of the present disclosure. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises an operating system 116 and in various embodiments may also comprise other software modules and engines configured to implement certain embodiments of the disclosed system.

Memory 112 includes storage for a plurality of software containers 118 that may be used to implement certain embodiments of the disclosed system. Containers A-D each include a respective application, App A-D, and corresponding dependencies, Depend A-D. Containers A-D may be instantiated by a container engine such as Docker.

In a Docker architecture, Docker runs on top of the operating system 116. A container, such as Containers A-D, are created on top of Docker. The containers include the required application, binary files, and library files required to run the application. In certain embodiments, Containers A-D share the kernel of the same operating system 116. However, it will be recognized by those skilled in the art, that containers may be executed on separate, different operating system kernels.

The example shown in FIG. 1 also includes a container orchestration system 122 that may be executed in certain embodiments of the disclosed system. The container orchestration system 122 manages the lifecycles of containers, especially in large, dynamic environments. Software teams may use the container orchestration system 122 to control and automate many tasks such as, for example, 1) provisioning and deployment of containers, 2) redundancy and availability of containers, 3) scaling up or removing containers to spread application load evenly across host infrastructure, 4) movement of containers from one host to another if there is a shortage of resources in a host, or if a host dies, 5) allocation of resources between containers, 6) external exposure of services running in a container, 7) load balancing of service discovery between containers, 8) health monitoring of containers and hosts, and 8) configuration of an application in relation to the containers running the application.

There are several different container orchestration systems that may be employed in the information handling system 100. Two such container orchestration systems include Kubernetes and DockerSwarm. Although the embodiments disclosed herein are discussed for a Kubernetes container orchestration system, it will be recognized, given the teachings of the present disclosure, that the disclosed system is extensive able to other container orchestration systems.

Figure 2:
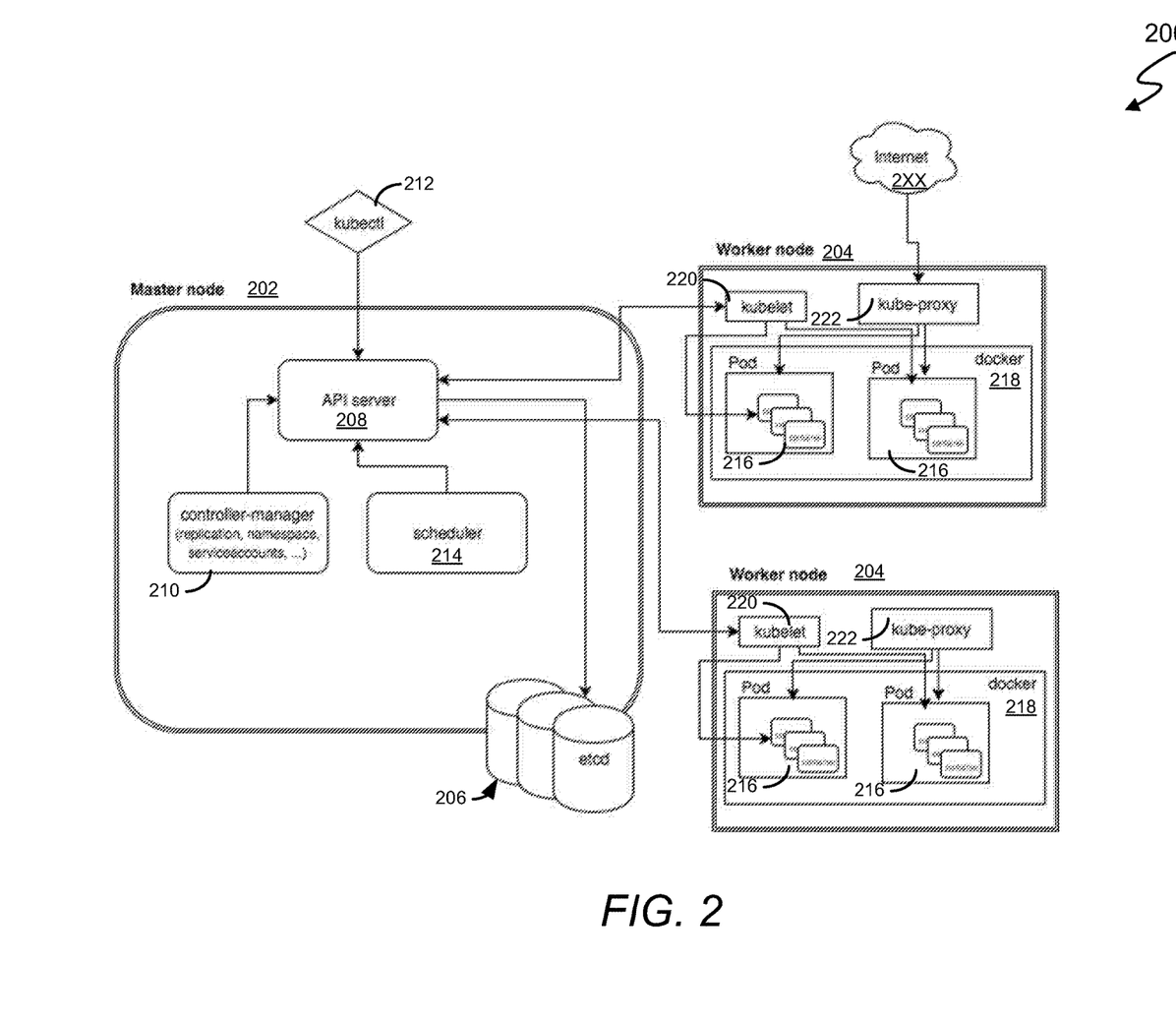
FIG. 2 shows one embodiment of a Kubernetes container orchestration system.

FIG. 2 shows one embodiment of a Kubernetes container orchestration system 200. In the example shown in FIG. 2, the container orchestration system 200 includes a master node 202 and a plurality of worker nodes 204. The master node 202 includes an etcd cluster 206. In certain embodiments, the etcd cluster 206 is a simple, distributed key value storage which is used to store Kubernetes cluster data (such as number of pods, the state of the pods, namespace, etc), API objects, and service discovery details. In certain embodiments, the etcd cluster 206 is only accessible from an API server 208 for security reasons. The etcd cluster 206 enables notifications to a cluster about configuration changes with the help of watchers. Notifications are API requests on each etcd cluster node that trigger the update of information in the node's storage.

The API server 208 of the master node 202 shown in FIG. 2 is a central management entity that receives all REST requests for modifications to pods (a co-located group of containers inside which application processes are running). The requests may also relate to modifying services, replication sets/controllers, and others. In certain embodiments, the API server 208 serves as a frontend to a container cluster. Certain embodiments of the API server 208 may communicate with the etcd cluster 206, making sure data is stored in the etcd cluster 206 and is in agreement with the service details of the deployed pods.

The master node 202 shown in FIG. 2 also includes Kube-controller-manager 210, which runs several distinct controller processes in the background to regulate the shared state of the cluster and to perform routine tasks. The Kube-controller-manager 210 may, for example, include 1) a replication controller configured to controls the number of replicas in a pod, 2) an endpoints controller configured to populates endpoint objects like services and pods. When a change in a service configuration occurs (for example, replacing the image from which the pods are running, or changing parameters in a configuration yam1 file), the Kube-controller-manager 210 spots the change and starts working towards the new desired state.

The embodiment shown in FIG. 2 also includes a cloud-controller-manager 212. In certain embodiments, the cloud-controller-manager 212 is responsible for managing controller processes with dependencies on the underlying cloud provider (if applicable). For example, the Kube-controller-manager 210 may check if a worker node has been terminated. In some examples, Kube-controller-manager 210 is used to set up routes, load balancers or volumes in the cloud infrastructure.

The embodiment shown in FIG. 2 also includes a scheduler 214. In certain embodiments, the scheduler 214 helps schedule the pods on the various nodes based on resource utilization. The scheduler 214 reads the operational requirements of a service and schedules the service to run on the best fit node. For example, if the application needs 1 GB of memory and 2 CPU cores, then the pods for that application will be scheduled on a node with at least those resources. The scheduler 214 runs each time there is a need to schedule pods. The scheduler 214 knows the total resources available on the worker nodes 204 as well as resources allocated to existing workloads on each worker node 204.

The worker nodes 204 of the example shown in FIG. 2 include a plurality of pods 216 operating on top of a Docker container engine 218. Each worker node 204 may include a kubelet 220. In certain embodiments, the kubelet 220 operates as the main service on a worker node 204, regularly taking in new or modified pod specifications (primarily through the API server 208) and ensuring that pods and the containers of the pod are healthy and running in the desired state. In certain embodiments, the kubelet 220 also reports to the master node 202 on the health of the host where the worker node 204 is running.

The worker nodes 204 of the example shown in FIG. 2 also include a kube-proxy 222. In certain embodiments, the kube-proxy 222 is a proxy service that runs on each worker node 204 to deal with individual host subnetting and expose services to the external world. In certain embodiments, the kube-proxy 222 performs request forwarding to the correct pods/containers across various isolated networks in a cluster.

One challenge when using container orchestration systems is managing network and firewall connectivity across different system providers and remote datacenters. Although the container orchestration systems of a given system provider (i.e., Azure has AKS, VMWare has PKS, etc.) may have characteristics which simplify the provisioning and deployment of the systems at the given system provider, application teams often deploy the application containers across multiple providers having different container orchestration systems. Once an application is deployed on a system provider, developers often have to resolve connectivity issues that arise from executing the same container on disparate platforms and clusters that have different container orchestration systems.

Figure 3:
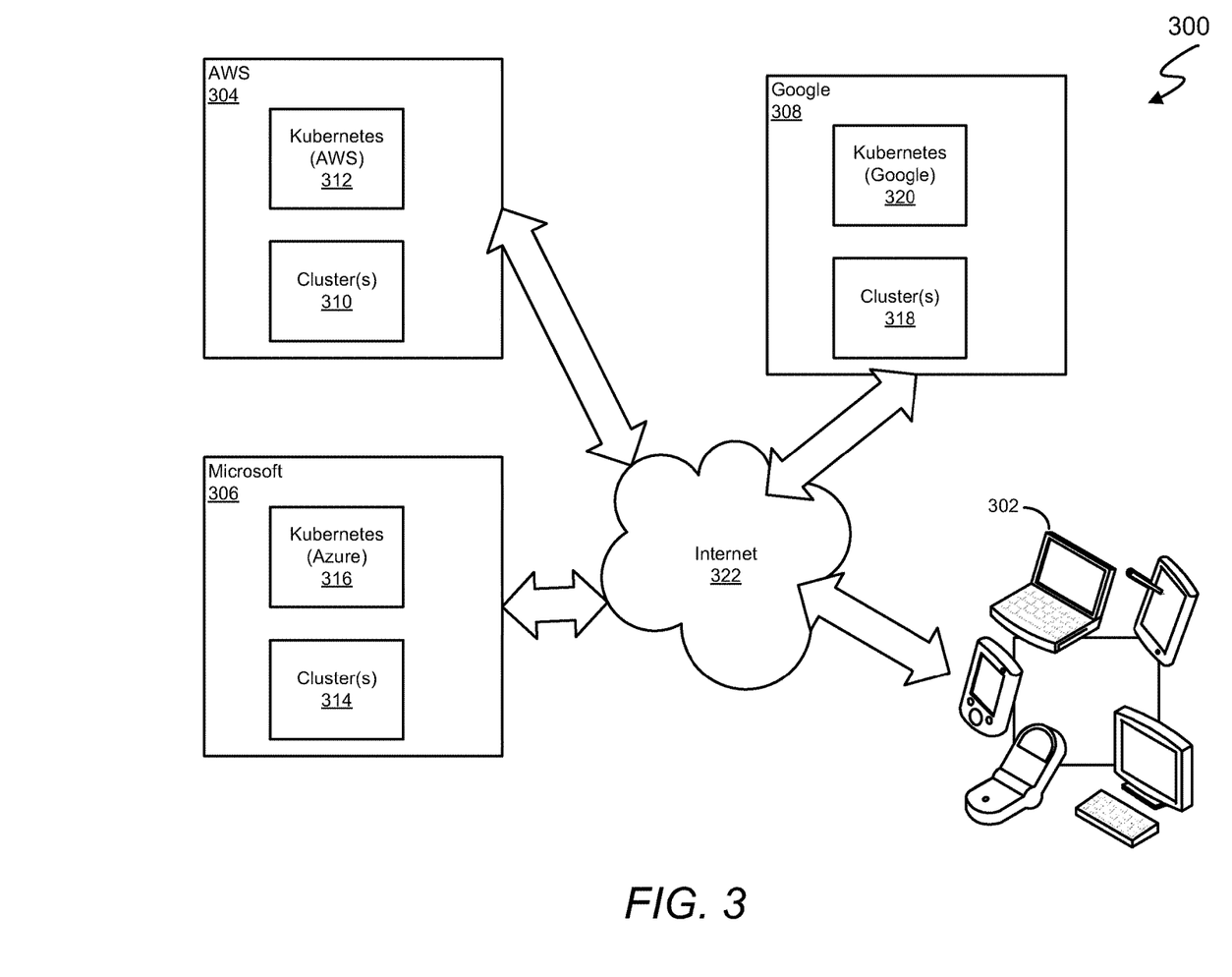
FIG. 3 depicts an electronic environment in which certain embodiments of the disclosed system may operate.

FIG. 3 depicts an electronic environment 300 in which certain embodiments of the disclosed system may operate. In this example, user devices 302 are configured to access services provided on one or more cloud platforms over the Internet 322. The cloud platforms in this example include an Amazon platform 304, a Microsoft platform 306, and a Google platform 308. The Amazon platform 304 includes a plurality of clusters 310 that are each orchestrated with a corresponding version of the Kubernetes (AWS) container orchestration system 312. The Microsoft platform 306 includes a plurality of clusters 314 that are each orchestrated with a corresponding version of the Kubernetes (Azure) container orchestration system 316. The Google platform 308 includes a plurality of clusters 318 that are each orchestrated with a corresponding version of the Kubernetes (Google) container orchestration system 320.

Although the Amazon platform 304, Microsoft platform 306, and Google platform 308 are each shown with corresponding Kubernetes container orchestration systems 312, 316, and 318, the different platforms often execute unique versions of Kubernetes container orchestration. Developers writing a container application for one platform do not have a guarantee that the same container application can be executed at another platform without problems. As such, developers often write different versions of container applications depending on the platform on which the container will run. Incompatibility can be particularly problematic when, for example, a container running on a cluster at one platform must be provisioned for execution at a cluster on another platform in response to a scale-up of the need for the container's services.

Figure 4:
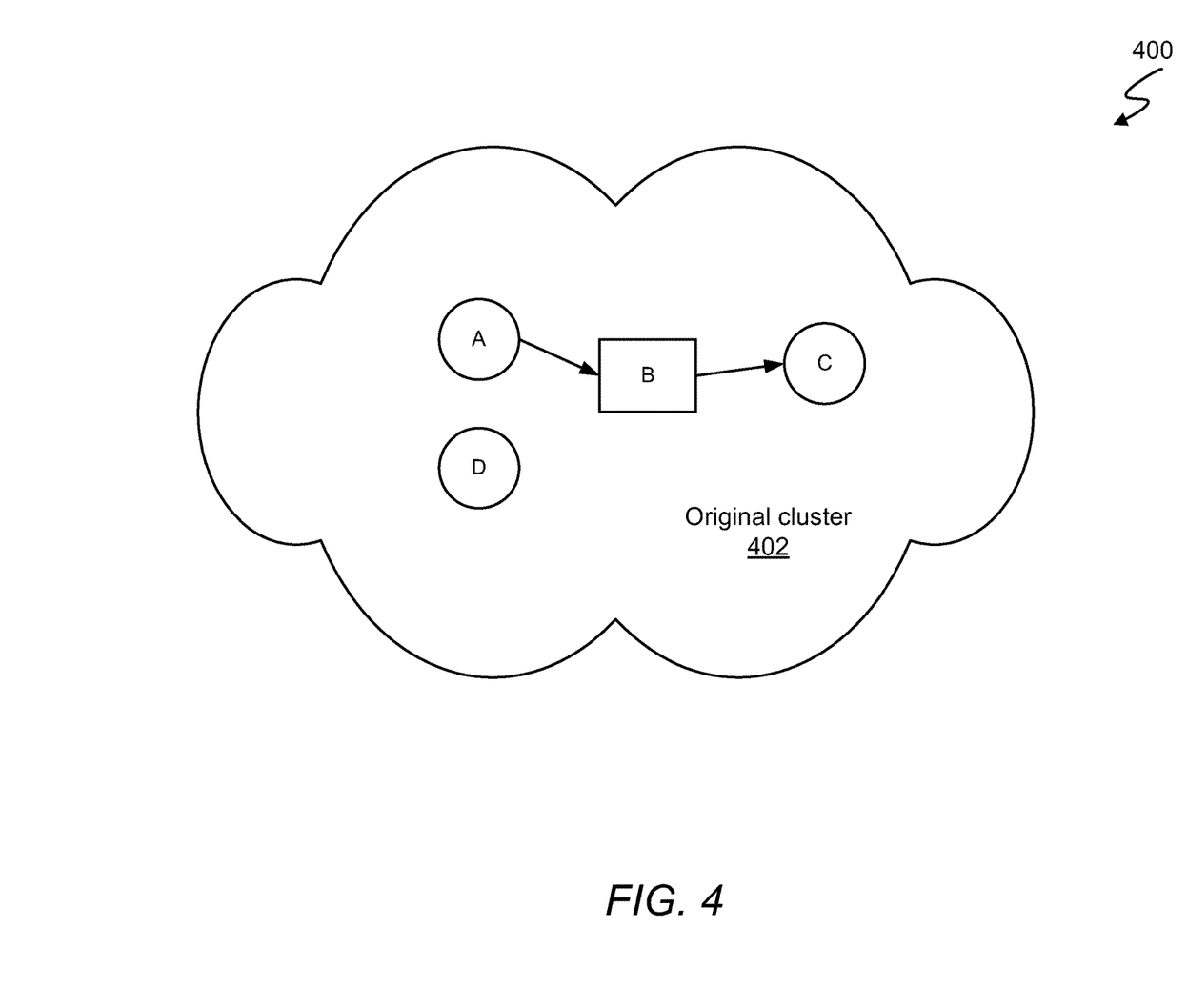
FIG. 4 depicts an electronic environment showing a standard local use case in which a container orchestration system manages all containers in a single cluster.

FIG. 4 depicts an electronic environment 400 showing a standard local use case in which a container orchestration system manages all containers in a single cluster. Here, container application D is self-contained and not dependent on other container applications in cluster 402. However, dependent container A is configured to consume a service provided by container C. In this example, service endpoint container B is created to make the container service hosted on C available to dependent container A. Since the container service is in the same cluster 402 as container A, the container service may be consumed with cluster-private addressing in the same host name/path (such as, for example, service-b.c-hostname/path.svc.cluster.local).

In a known multi-cluster use case (not shown), container C may be moved from the original cluster 402 to a target cluster that, for example, executes a different container orchestration system. Being on a different cluster, container C now operates in a new host name/path. In this use case, an ingress container D is created at the target cluster and inserted to expose service endpoint B. As a result of the movement of the container to the target cluster, the configuration of container A must be updated to the FQDN exposed by an ingress container at the target cluster (such as, for example, service-b.c-hostname/path.external-cluster-name. datacenter.region.company.com).

In another known multi-cluster use case (not shown), dependent container A is provided with a sidecar container. The sidecar for container A proxies all the traffic for container A. Using a sidecar, container A can access ingress container D through an alternate FQDN that is more convenient but still not within the same local hostname/path or address space as container A.

Figure 5:
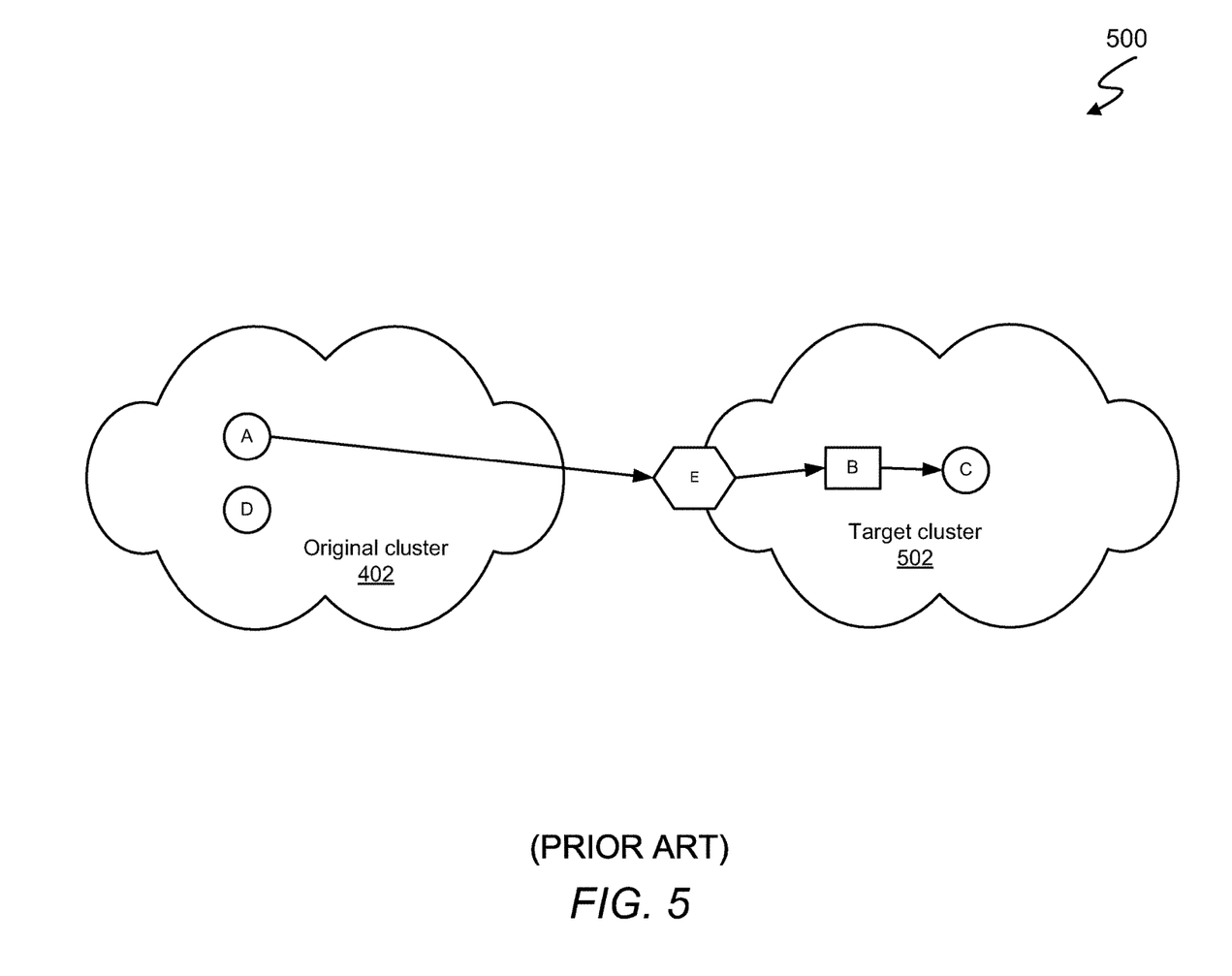
FIG. 5 depicts an electronic environment of the prior art.

FIG. 5 depicts an electronic environment of the prior art.

Figure 6:
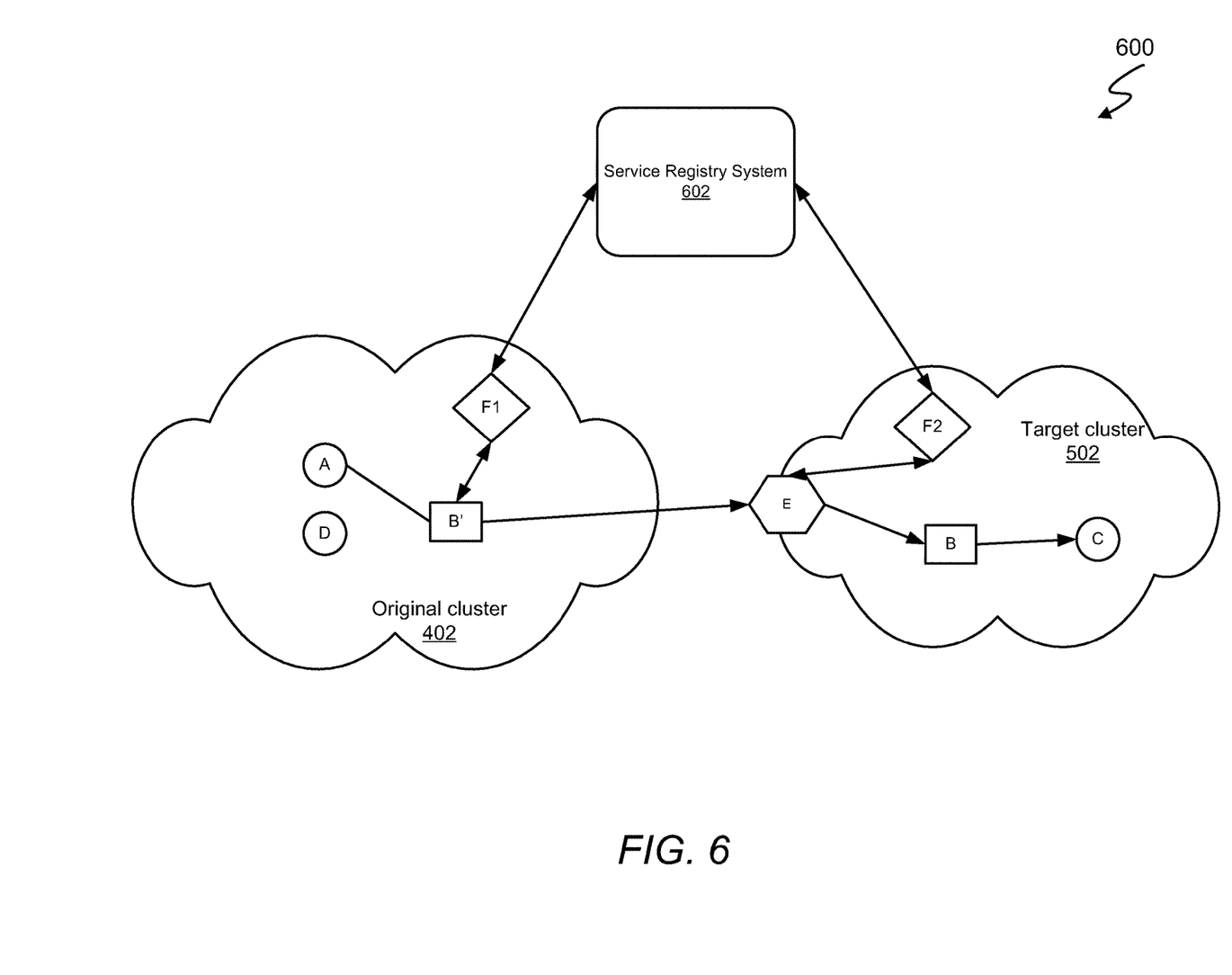
FIG. 6 depicts a system architecture for implementing certain embodiments of the disclosed system.

FIG. 6 depicts a system architecture 600 for implementing certain embodiments of the disclosed system. In this example, the system architecture 600 includes a service registry system 602 that is accessible to mesh operators F1 and F2 disposed respectively in the original cluster 402 and target cluster 502. In certain embodiments, the mesh operators F1 and F2 are configured as software that encodes domain knowledge for a cluster and extends the Kubernetes API to enable users to create, configure, and manage stateful applications within the respective clusters 402 and 502. Like Kubernetes's built-in resources, an operator does not merely manage a single instance of the application container, but manages multiple instances of the application container across the cluster.

In certain embodiments, the service registry system 602 maintains a list of services and corresponding IP addresses that are to be globally available in the cluster mesh. In certain embodiments, the service registry system 602 can reside in one of the container orchestration systems of the original cluster and/or target cluster. Additionally, or in the alternative, the service registry system 602 can be a stand-alone deployment elsewhere, as long as the service registry system 602 can be contacted by all of the peered container orchestration systems. In certain embodiments, the service registry system 602 is populated with IP addresses of the globally available services when the services are discovered by the cluster orchestration system in a managed cluster. In certain embodiments, the services registry system 602 is maintained using cluster orchestration system operators when services are added, deleted, or moved. In certain embodiments, the services registry system 602 may be directly updated during application deployments. In certain embodiments, the service registry system 602 supports create, read, update, and delete operations.

In the example shown in FIG. 6, service endpoint container B and service container C have been moved from the original cluster 402 to the target cluster 502. This action may result in the following exemplary update to the service registry data:

| Service Name | Hostname/path | Discovered Address |
| --- | --- | --- |
| Service-b | c-hostname/path | 10.1.2.3 |

The principal change before and after a cluster move in this embodiment is an update of the 'discovered address' field. The service registry data is the 'source of truth' location for all peered services in certain embodiments.

The mesh operators F1 and F2 may support different functions inside the respective clusters 402 and 502. In certain embodiments, the mesh operator F1 accesses information relating to service endpoint container B, now operating at the target cluster 502, from the service registry system data. In certain embodiments, the mesh operator F1 uses the service registry data to configure a remote service endpoint container B', which operates as a shim that transparently intercepts calls from the dependent container A and redirects the calls to the service endpoint container B at the target cluster 502. In one example, the remote service endpoint B' receives calls from dependent container A in the hostname/path of original cluster 402 and redirects the calls to the new IP address associated with service endpoint container B, now operating in the target cluster 502 at the target cluster 502. In certain embodiments, the remote service endpoint container B' redirects the calls by changing the hostname/path and/or address space of the calls made by dependent container A to the hostname/path and/or address space associated with the service endpoint container B at the target cluster 502. In this manner, the dependent container A may access the services available at service endpoint container B as though service endpoint container B is present in the same cluster (e.g., in original cluster 402).

In the example shown in FIG. 6, the target cluster 502 includes an ingress container E. In certain embodiments, the mesh operator F2 accesses service registry information from the service registry system 602 and configures the ingress container E to allow passage of calls from the remote service endpoint B' to the service endpoint container B. Ingress container E must know the hostname/path the ingress container E is listening for (i.e., service-b.hostname/path.svc.cluster.local) and which backend pods to direct traffic to in the target cluster 502. The ingress container E uses the configuration information of the service registry system 602 listens for traffic directed to that hostname/path and directs the call to the proper container/pod.

Figure 7:
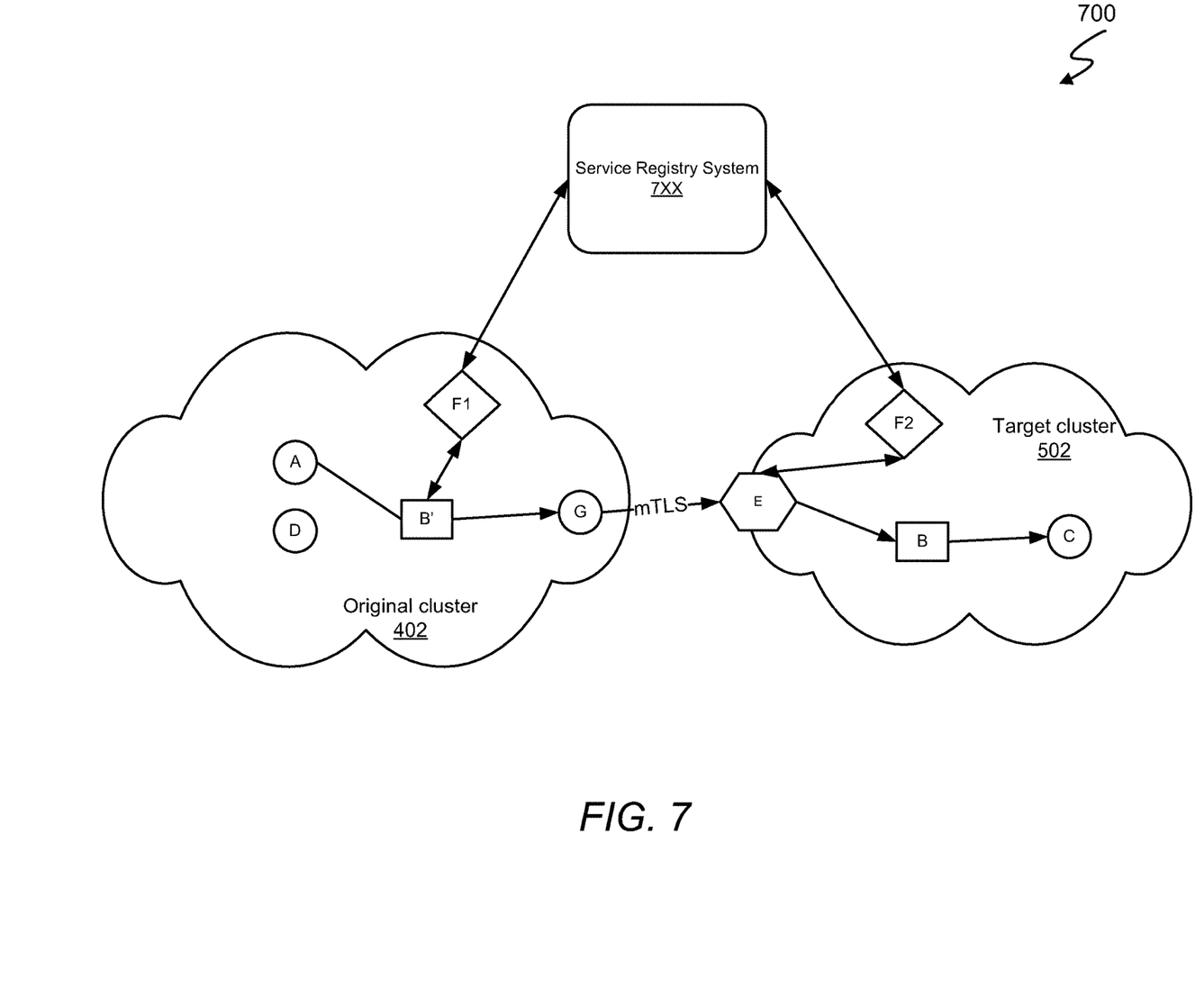
FIG. 7 depicts a system environment in which communications of calls between a remote endpoint service container and a target cluster are secured.

In the example shown in FIG. 7, remote endpoint service container B' is configured to communicate with ingress container E of the target cluster 502 either directly on the same machine and/or directly over a network such as the Internet. However, such direct communications expose the calls between the clusters 402 and 502 may result in security issues. FIG. 7 depicts a system environment 700 in which communications of calls between the remote endpoint service B' and the target cluster 502 are secured. In this example, original cluster 402 employs an egress proxy container G, which is used to establish an mTLS connection between clusters 402 and 502, thereby providing bidirectional trust in ensuring that no external actors have access to ingress container E.

Figure 8:
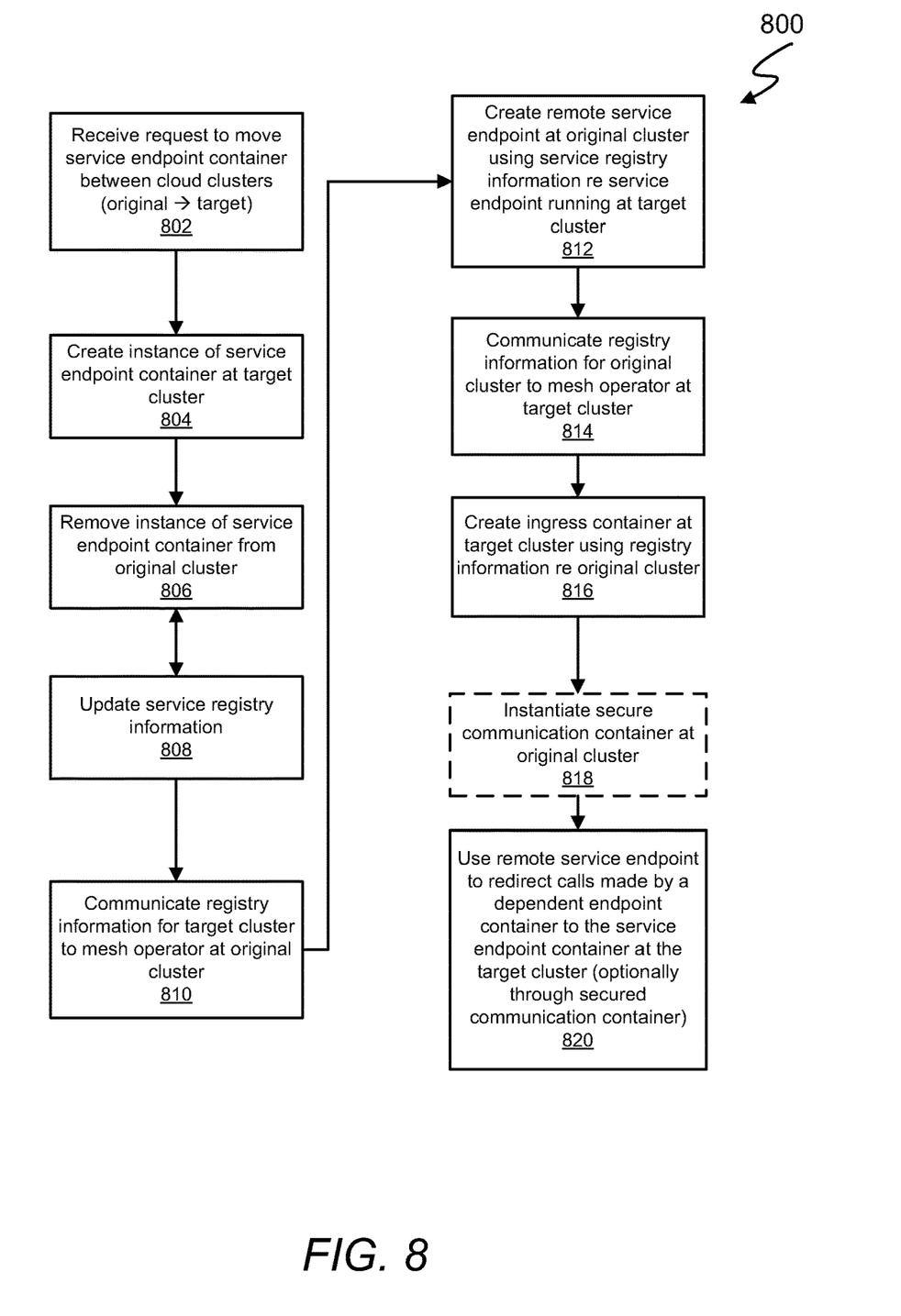
FIG. 8 is a flowchart showing exemplary operations that may be executed in certain embodiments of the disclosed system.

FIG. 8 is a flowchart 800 showing exemplary operations that may be executed in certain embodiments of the disclosed system. In this example, a request to move a service endpoint container between an original cluster on a first platform to a target cluster on a different platform is received at operation 802. At operation 804, an instance of the service endpoint container is created at the target cluster, and the instance of the service endpoint container is removed from the original cluster at operation 806. In certain embodiments, the service registry information associated with the creation of the service endpoint container at the target cluster and removal of the service endpoint container from the original cluster is updated at operation 808. At operation 810, the registry information for the service endpoint container running at the target cluster is communicated to a mesh operator at the original cluster. When container is moved between clusters, the original cluster needs is updated with a new remote service endpoint that points to the target cluster for the container. The mesh operator F1 in the original cluster identifies the new service location of the moved container and deploys the remote service endpoint B' with the new information. At operation 812, the service registry information accessed by the mesh operator at the original cluster in certain embodiments is used by the mesh operator to create a remote service endpoint at the original cluster.

In certain embodiments, registry information associated with the original cluster and/or remote service endpoint container is communicated to a mesh operator at the target cluster at operation 814. At operation 816, certain embodiments of the mesh operator configure an ingress container at the target cluster using the registry information accessed by the mesh operator. In certain embodiments, a secure communication container is instantiated at the original cluster at operation 818 to secure communications between the original cluster and target cluster.

Certain embodiments use the remote service endpoint at the original cluster to redirect calls made by a dependent endpoint container at the original cluster to the service endpoint container running at the target cluster. In certain embodiments, the remote service endpoint redirects calls by redirecting the calls received from the dependent endpoint container to the IP address of the hostname/path of the service endpoint container in the address space of the target cluster.

Embodiments of the disclosure are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

What is claimed is:

1. A computer-implemented method for moving an endpoint service container between clusters of a cluster mesh, the cluster mesh including an original cluster and a target cluster, the method comprising:
    operating respective container orchestration systems at the original cluster and the target cluster, wherein the original cluster includes at least one endpoint service container and a dependent container configured to consume a service available at the endpoint service container, the dependent container consuming services at the endpoint container in the target cluster as though the endpoint container is local to the original cluster;

moving the endpoint service container from the original cluster to the target cluster;
updating service registry information relating to moving the endpoint service container from the original cluster to the target cluster, wherein the service registry information includes a list of services that are globally available in the cluster mesh, wherein the list of services includes at least one service available at the endpoint service container in the target cluster;
accessing the service registry information at the original cluster using a mesh operator executed by the container orchestration system of the original cluster;
establishing a remote service endpoint container at the original cluster using service registry information accessed by the mesh operator of the original cluster;
accessing the service registry information at the target cluster using a mesh operator executed by the container orchestration system of the target cluster;
configuring an ingress container at the target cluster using the service registry information accessed by the mesh operator of the target cluster; and
using the remote service endpoint container to allow the dependent container at the original cluster to consume services available from the endpoint service container of the target cluster.

2. The computer-implemented method of claim 1, wherein
the original cluster operates at a first hostname/path, and the target cluster operates at a second hostname/path; and
the service registry information includes the IP address of the second hostname/path at which the endpoint service container can be reached at the target cluster.

3. The computer-implemented method of claim 2, wherein
the dependent container operates at a first hostname/path; and
the remote service endpoint container receives requests to consume services from the dependent container using the first hostname/path, and wherein the remote service endpoint container translates requests to consume services made by the dependent container in the first hostname/path with the second hostname/path.

4. The computer-implemented method of claim 1, wherein
the dependent container operates in a first hostname/path; and
the remote service endpoint container translates calls made to the endpoint service container from the first hostname/path to calls using a fully qualified domain name of the endpoint service container at the target cluster.

5. The computer-implemented method of claim 1, wherein
the container orchestration system at the original cluster is a different type of container orchestration system than the type of container orchestration system at the target cluster.

6. The computer-implemented method of claim 1, further comprising:
instantiating and operating a communication security container at the original cluster to establish secure communication between the remote service endpoint container at original cluster and an ingress container at the target cluster.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
operating respective container orchestration systems at an original cluster and a target cluster, wherein the original cluster includes at least one endpoint service container and a dependent container configured to consume a service available at the endpoint service container, the dependent container consuming services at the endpoint container in the target cluster as though the endpoint container is local to the original cluster;
moving the endpoint service container from the original cluster to the target cluster;
updating service registry information relating to moving the endpoint service container from the original cluster to the target cluster, wherein the service registry information includes a list of services that are globally available in a cluster mesh that includes the original cluster and target cluster, wherein the list of services includes at least one service available at the endpoint service container in the target cluster;
accessing the service registry information at the original cluster using a mesh operator executed by the container orchestration system of the original cluster;
establishing a remote service endpoint container at the original cluster using service registry information accessed by the mesh operator of the original cluster;
accessing the service registry information at the target cluster using a mesh operator executed by the container orchestration system of the target cluster;
configuring an ingress container at the target cluster using the service registry information accessed by the mesh operator of the target cluster; and
using the remote service endpoint container to allow the dependent container at the original cluster to consume services available from the endpoint service container of the target cluster.

8. The system of claim 7, wherein
the original cluster operates at a first hostname/path, and the target cluster operates at a second hostname/path; and
the service registry information includes the second hostname/path at which the endpoint service container can be reached at the target cluster.

9. The system of claim 8, wherein
the dependent container operates at the first hostname/path; and
the remote service endpoint container receives requests to consume services from the dependent container at the first hostname/path, and wherein the remote service endpoint container translates requests to consume services made by the dependent container at the first hostname/path to the second hostname/path.

10. The system of claim 7, wherein
the dependent container operates in a first hostname/path; and
the remote service endpoint container translates calls made to the endpoint service container from the first hostname/path to calls using a fully qualified domain name of the endpoint service container at the target cluster.

11. The system of claim 7, wherein
the container orchestration system at the original cluster is a different type of container orchestration system than the type of container orchestration system at the target cluster.

12. The system of claim 7, wherein the instructions are further configured for:
instantiating and operating a communication security container at the original cluster to establish secure communication between the remote service endpoint container at original cluster and an ingress container at the target cluster.

13. A non-transitory, computer-readable storage medium embodying computer program code, the computer program code comprising computer executable instructions configured for:
operating respective container orchestration systems at an original cluster and a target cluster, wherein the original cluster includes at least one endpoint service container and a dependent container configured to consume a service available at the endpoint service container, the dependent container consuming services at the endpoint container in the target cluster as though the endpoint container is local to the original cluster;
moving the endpoint service container from the original cluster to the target cluster;
updating service registry information relating to moving the endpoint service container from the original cluster to the target cluster, wherein the service registry information includes a list of services that are globally available in a cluster mesh that includes the original cluster and target cluster, wherein the list of services includes at least one service available at the endpoint service container in the target cluster;
accessing the service registry information at the original cluster using a mesh operator executed by the container orchestration system of the original cluster;
establishing a remote service endpoint container at the original cluster using service registry information accessed by the mesh operator of the original cluster;
accessing the service registry information at the target cluster using a mesh operator executed by the container orchestration system of the target cluster;
configuring an ingress container at the target cluster using the service registry information accessed by the mesh operator of the target cluster; and
using the remote service endpoint container to allow the dependent container at the original cluster to consume services available from the endpoint service container of the target cluster.

14. The non-transitory, computer-readable storage medium of claim 13, wherein
the original cluster operates in a first hostname/path, and the target cluster operates in a second hostname/path; and
the service registry information includes the second hostname/path at which the endpoint service container can be reached at the target cluster.

15. The non-transitory, computer-readable storage medium of claim 14, wherein
the dependent container operates in the first hostname/path; and
the remote service endpoint container receives requests to consume services from the dependent container in the first hostname/path, and wherein the remote service endpoint container translates requests to consume services made by the dependent container in the first hostname/path with the second hostname/path.

16. The non-transitory, computer-readable storage medium of claim 13, wherein
the dependent container operates in a first hostname/path; and
the remote service endpoint container translates calls made to the endpoint service container from the first hostname/path to calls using a fully qualified domain name of the endpoint container at the target cluster.

17. The non-transitory, computer-readable storage medium of claim 13, wherein
the container orchestration system at the original cluster is a different type of container orchestration system than the type of container orchestration system at the target cluster.

18. The non-transitory, computer-readable storage medium of claim 13, wherein
the instructions are further configured for:
instantiating and operating a communication security container at the original cluster to establish secure communication between the remote service endpoint container at original cluster and an ingress container at the target cluster.

* * * * *